United States Patent
Van Nieuwenhuyze et al.

(10) Patent No.: US 12,445,853 B2
(45) Date of Patent: Oct. 14, 2025

(54) PROTECTION OF A TRANSACTION IN NEAR-FIELD COMMUNICATIONS

(71) Applicants: STMICROELECTRONICS (ROUSSET) SAS, Rousset (FR); STMICROELECTRONICS BELGIUM, Machelen (BE)

(72) Inventors: Olivier Van Nieuwenhuyze, Wezembeek-Oppem (BE); Alexandre Charles, Auriol (FR)

(73) Assignees: STMICROELECTRONICS (ROUSSET) SAS, Rousset (FR); STMICROELECTRONICS BELGIUM, Machelen (BE)

(*) Notice: Subject to any disclaimer, the term of this patent is extended or adjusted under 35 U.S.C. 154(b) by 31 days.

(21) Appl. No.: 18/541,860

(22) Filed: Dec. 15, 2023

(65) Prior Publication Data
US 2024/0224047 A1 Jul. 4, 2024

(30) Foreign Application Priority Data
Jan. 2, 2023 (FR) .................................... 2300007

(51) Int. Cl.
*H04W 12/47* (2021.01)
*H04W 12/06* (2021.01)
*H04W 12/60* (2021.01)
*H04W 12/50* (2021.01)
*H04W 12/71* (2021.01)
*H04W 12/79* (2021.01)

(52) U.S. Cl.
CPC ........... *H04W 12/47* (2021.01); *H04W 12/06* (2013.01)

(58) Field of Classification Search
None
See application file for complete search history.

(56) References Cited

U.S. PATENT DOCUMENTS

| | | | | |
|---|---|---|---|---|
| 7,450,511 | B2* | 11/2008 | Jang | H04L 1/1685 370/235 |
| 9,858,450 | B2* | 1/2018 | Van Bosch | G06K 19/07775 |
| 10,028,140 | B2* | 7/2018 | Minami | H04L 63/0853 |
| 10,908,699 | B2* | 2/2021 | Lee | H02J 50/20 |
| 10,917,514 | B1* | 2/2021 | Chen | H04W 4/80 |

(Continued)

OTHER PUBLICATIONS

Payload Formats and Universal Data for Near Field Communication. Harnaningrum. IJCA. (Year: 2018).*

(Continued)

*Primary Examiner* — Venkat Perungavoor
(74) *Attorney, Agent, or Firm* — Seed Intellectual Property Law Group LLP

(57) ABSTRACT

Provided are techniques for protecting a transaction in near-field communication. Provided is an electronic device including a processor hosting an application, a near-field communication module, and a secure element distinct from the processor. The near-field communication module is configured to identify the type of terminal emitting a polling frame, addressed to the application, that the communication module receives by analyzing the type of the polling frame. The device is configured to compare the result of the analysis with at least one command received from the terminal during the implementation of an NFC transaction.

19 Claims, 4 Drawing Sheets

(56) References Cited

U.S. PATENT DOCUMENTS

| | | | |
|---|---|---|---|
| 11,637,591 B2* | 4/2023 | Spiss | H04B 5/77 |
| | | | 455/41.1 |
| 12,119,893 B2* | 10/2024 | Spiss | H04B 5/77 |
| 2014/0263648 A1* | 9/2014 | Van Bosch | G06K 7/10138 |
| | | | 235/450 |
| 2015/0163724 A1 | 6/2015 | Tanabe | |

OTHER PUBLICATIONS

Comparison of Internet of Things (IoT) Data Link Protocols. Rahman. (Year: 2015).*

Application of Near Field Communication Technology for Mobile Airline Ticketing. Suparta. JCS. (Year: 2012).*

* cited by examiner

PROTECTION OF A TRANSACTION IN NEAR-FIELD COMMUNICATIONS

BACKGROUND

Technical Field

The present disclosure generally concerns electronic devices, and more particularly electronic devices adapted to processing secret data. More particularly, the present disclosure concerns electronic devices adapted to implementing a near-field communication (NFC), and in particular an NFC transaction, where at least a portion of the exchanged data are secret data and/or a portion of the exchanged data are critical data allowing, for example, a method of identification or of authentication of a user.

Description of the Related Art

Complex electronic devices, such as cell phones, electronic tablets, computers, etc., integrate, over time, more and more functionalities and enable to establish digital services to better integrate to everyday life. As an example, certain cell phones, and more particularly smart phones, integrate digital services such as a bank payment service, or also a service of use of public transport tickets, show tickets, an authentication of the user for a distant system (bank, public administration, etc.). To implement these functionalities, these devices may integrate electronic components specific to these functionalities, such as for example secure components which enable to keep/store identification, reference, and authentication data, generally called "credentials", and assets of the provider of the digital service, motion sensors, a near-field communication (Near Field Communication, NFC) module, etc.

A difficulty resulting from the addition of new functionalities is that secret data and/or critical data may be made accessible by error.

BRIEF SUMMARY

There exists a need for an electronic device adapted to implementing an NFC transaction in more secure fashion.

There exists a need for an electronic device adapted to detecting a malicious device trying to start an NFC transaction.

Provided is an electronic device implementation of NFC transactions.

An embodiment provides an electronic device adapted to analyzing an emission frame of a terminal to verify the authenticity of said terminal.

An embodiment provides an electronic device comprising a processor hosting an application, a near-field communication module, and a secure element distinct from the processor, wherein the near-field communication module is configured to identify the type of a terminal emitting a polling frame, addressed to said application, that the communication module receives by analyzing the type of said polling frame, said device being configured to compare the result of said analysis with at least one command received from said terminal during the implementation of an NFC transaction.

Another embodiment provides a method of protection of an electronic device comprising a processor hosting an application, a near-field communication module, and a secure element distinct from the processor, said method comprising the following successive steps during the implementation of a transaction:

said near-field communication module identifies the type of a terminal emitting a polling frame, addressed to said application, that it receives by analyzing the type of said polling frame; and said device compares the result of said analysis with at least one command received from said terminal during the implementation of an NFC transaction.

According to an embodiment, once said comparison has been performed, said at least one command is transmitted to said application with the result of the comparison.

According to an embodiment, once said comparison has been performed, the result of said analysis is transmitted to the application with said at least one command and said result of the comparison.

According to an embodiment, said application is configured to take the decision of responding or not to said command.

According to an embodiment, said near-field communication module comprises an antenna circuit adapted to radio frequencies, said circuit being configured to identify the type of a terminal emitting a polling frame, addressed to said application, that it receives by analyzing the type of said polling frame.

According to an embodiment, said secure element is configured to compare the type of terminal with said at least one received command.

According to an embodiment, said near-field communication module is, further, configured to compare the type of terminal with said at least one received command.

According to an embodiment, said near-field communication module is, further, configured to send erroneous data to the sender if the result of said comparison indicates that the type of the sender is not reliable.

According to an embodiment, if the result of said comparison indicates that the type of the sensor is not reliable, said at least one application refuses to send critical data.

According to an embodiment, said comparison is performed by comparing said result of said analysis with at least two commands received from said terminal during the implementation of an NFC transaction.

According to an embodiment, said comparison is further performed by interrogating a user of said device.

According to an embodiment, said processor further hosts at least one software interface layer adapted to implementing said at least one application.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the protocols used to implement the wireless communications are not detailed herein. Usual protocols may be used herein.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
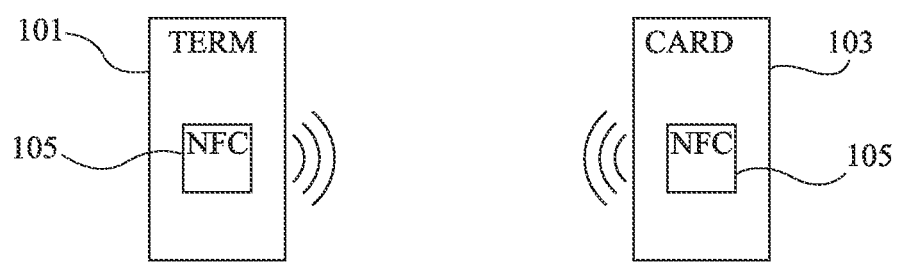
FIG. 1 schematically shows in the form of blocks an example of embodiment of a wireless transaction.

FIG. 1 schematically illustrates in the form of blocks an NFC transaction between an electronic device 101 (TERM) used as a mobile terminal, or mobile terminal 101, and an electronic device 103 (CARD) used as a distant module, or distant module 103, also called card device 103.

There is here called transaction a specific communication aiming at a commercial and/or monetary transaction where a device, terminal 101, is the "payment" terminal which implements the transaction and the other device, distant module 103, is that which accepts or not the transaction. An example of a transaction concerned by the embodiments described hereafter is a bank transaction. Another example of a concerned transaction is the buying of a transport ticket. Other types of transactions can be envisaged, and the two above-mentioned examples are not limiting. The NFC transaction concerned herein is particularly a transaction where the two devices are likely to exchange critical and/or secret data.

An NFC transaction is a wireless and contactless communication using, for its implementation, a near-field communication technology, called NFC communication hereafter. Near-field communication (NFC) technologies enable to performed high-frequency and short-range communications. Such systems use a radio frequency electromagnetic field emitted by a device (terminal or reader) to communicate with another device (distant module, transponder or card).

The case of two electronic devices, for example terminal 101 and distant module 103, is assumed, but all that will be described more generally applies to any system where a transponder captures an electromagnetic field radiated by a reader or terminal. In this type of communication, electronic devices 101 and 103 are positioned within range of each other, that is, at a distance generally smaller than 10 cm. According to another example, devices 101 and 103 are in mechanical contact with each other.

According to applications, for an NFC communication, one of the devices, terminal 101, operates in so-called reader mode while the other, distant module 103, operates in so-called card emulation mode, or the two devices operate in peer-to-peer (P2P) mode. Each device 101, 103 comprises various electronic circuits 105 (NFC) adapted to emitting a radio frequency signal (RF) transmitted by means of an antenna of an oscillating/resonant circuit. The radio frequency field generated by one of the devices, for example, terminal 101, is captured by the other device, for example distant module 103, which is within range and which also comprises an antenna. When terminal 101 emits an electromagnetic field to initiate a communication with distant module 103, this field is captured by distant module 103 as soon as it is within range. A procedure for establishing a communication is then started, implementing emissions of requests by terminal 101 and of responses by distant module 103.

More particularly, when terminal 101 emits an electromagnetic field to initiate a communication with distant module 103, it more precisely emits a polling frame, also called polling sequence, active waiting frame, or active waiting sequence. A polling frame is a series of data and/or of control signals emitted by terminal 101 to initiate an NFC communication. The polling frame generally comprises data of identification of terminal 101 but also data relative to the type of NFC communication NFC that terminal 101 is ready to receive. Thus, a polling frame is characterized by the terminal which emits it and by the type of distant module to which it is addressed. The polling frames emitted by terminals are, for most of them, defined by standards and enable to characterize a terminal and/or a communication implemented by this terminal. The polling frames are generally repeated until a distant module responds. A polling frame may be characterized by the data that it conveys, but also by its time characteristics, such as the duration of the polling frame or the waiting times between two successive polling frames, or by the physical characteristics of the electromagnetic field which transmits it, for example, its power. According to an example, the emission protocols of the emission frames are implemented by state machines.

According to a specific example, certain terminals may emit successive frames concerning different types of distant modules. Thus, if a distant module tries to establish a communication with one of its terminals, by responding to all the polling frames, even the polling frames which do not concern it, that the terminal can detect. This may enable the terminal to detect a malicious distant module, and thus to be protected therefrom, for example, by refusing an NFC communication, or by refusing to transmit secret and/or critical data.

There further exists a plurality of types de polling frames, which are defined by ISO standard 14443, such as frames of type A, B, and F, defined by protocols also called A, B, and F. It is possible, due to these protocols, to allow the use of certain commands such as commands of type WUPA or WUPB instead of commands of type ReqA and ReqB, these types of command also being defined by ISO standard 14443. The use of such commands further enables to characterize the type of terminal emitting a polling frame.

Terminal 101 is an electronic device which may be, for example, fixed or mobile. Terminal 101 is in charge of starting the communication. As an example, terminal 101 is an electronic device adapted to implementing a transaction application as a terminal of the transaction. According to a more detailed example, terminal 101 is a cell phone, for example, a smart phone, implementing a point-of-sale (POS) application, that is, an application enabling it to implement a transaction as a terminal. According to another example, terminal 101 may be a connected device, such as a connected watch, adapted to implementing a near-field communication, and more particularly an NFC transaction. According to another example, terminal 101 may be a payment terminal implementing a point-of-sale application.

Distant module 103 is a generally mobile device. According to a preferred embodiment, distant module 103 is an IC card (or chip card), for example, a bank card or a transport card. As a variant, distant module 103 could be a cell phone. Distant module 103 comprises different electronic circuits adapted to implementing various commands sent by terminal 101, such as for example authentication circuits, cryptography circuits, etc.

In recent systems, a same NFC device may operate in card emulation mode or in reader mode (for example in the case of a near-field communication between two cell phones), and may select, according to cases, whether it operates in reader mode or in card emulation mode. According to an example, module 101 may be used as a reader or terminal adapted to implementing a payment transaction, and, in another case, be used as a card, for example, to validate a transport ticket.

Further, certain terminals may have specific behaviors in cases where, after the emission of a polling frames, a plurality of distant modules wishing to start an NFC communication are detected. According to an example, these terminals may detect said plurality of distant modules due to the protocols that they implement once responses have been received from these distant modules.

Figure 2:
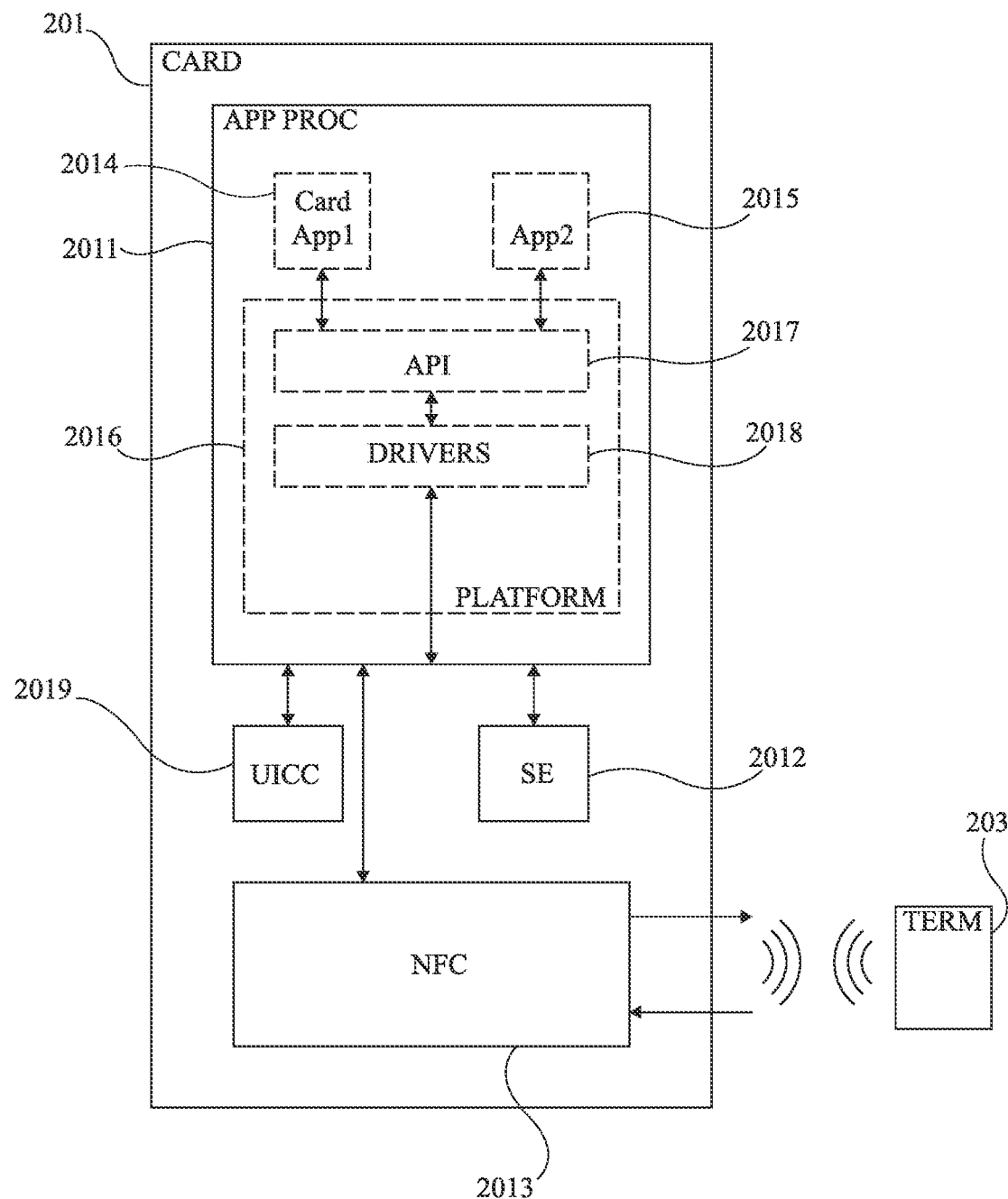
FIG. 2 schematically shows in the form of blocks an embodiment of an electronic device.

FIG. 2 schematically shows, but in further detail, and in the form of blocks, an embodiment of an NFC transaction, of the type of that described in relation FIG. 1, between an electronic device 201 (CARD) used in card emulation mode, or card device 201, and a terminal 203 (TERM). FIG. 2 illustrate in further details the hardware (in full lines) and software (in dotted lines) structure of card device 201, terminal 203 being identical to the terminal 103 described in relation with FIG. 1.

Card device 201 comprises, at least:
a processor 2011 (APP PROC);
a secure element (SE) 2012;
a near-field communication module (NFC) 2013; and
a universal integrated circuit card 2019.

Processor 2011 is a processor adapted, among others, to implementing a software architecture of card device 201, described hereafter. The processor may be configured to execute executable instructions of (that are part of) an application and the device 201 may include memory that store the application.

Secure element 2012 is a secure circuit or component, for example, a processor, or a calculation unit, adapted to manipulating secret data, or confidential data. The secure element is distinct from processor 2011. Secure element 2012 may, for example, implement data authentication, ciphering and/or deciphering, cipher and/or decipher algorithms, etc. According to an example, secure element 2012 is a secure element embarked in card device 201, but, according to a variant, secure element 2012 may be a secure element integrated to terminal 203. The advantage of having an embarked or integrated secure element is that this enables to have a high protection level, since secure element forms part of device 100. According to still another variant, secure element 2012 may form part of a secure platform which physically isolates it from the other components of device 201, or secure element 2012 may be combined to processor 2011 by benefiting from a hardware portion which physically isolates it from processor 2011, for example by using a TrustZone-type technology. The last two variants have a lower protection level than the previous variants. According to an embodiment, secure element 2012 is capable of knowing whether an NFC transaction is a transaction during which information and critical data may be exchanged.

Near-field communication module (e.g., NFC device) 2013, or NFC module 2013, is an assembly of circuits and of one or a plurality of antennas allowing card device 201 to implement a near-field communication, and, in particular, an NFC transaction of the type of that described in relation with FIG. 1. According to an embodiment, the NFC module comprises at least one antenna circuit. NFC module thus enables to send and to receive data, like the circuits 105 described in relation with FIG. 1. According to an example, NFC module 2013, or its antenna circuit, is configured to identify the type of terminal emitting a polling frame by analyzing a polling frame that it captures. More particularly, NFC module is adapted to analyzing the data conveyed by the polling frame, its time characteristics, and/or the technical characteristics of the electromagnetic field transmitting the frame. According to an embodiment, NFC module 2013 is, further, adapted to comparing the type of terminal which has been previously determined with a command then received from said terminal. According to a variant, the secure element is adapted to comparing the type of terminal previously determined by NFC module 2013 with a command received afterwards from said terminal.

Universal integrated circuit card 2019 (UICC) is an integrated circuit card used in electronic devices to store, in secure fashion, all sorts of critical, secret, and/or personal data. Universal integrated circuit card 2019 is here optional.

These four elements are adapted to communicating with each other by different communication means. According to an example, processor 2011 is adapted to communicating with NFC module 2013, for example, via a bus of I2C (Inter Integrated Circuit) type, a bus of SPI (Serial Peripheral Interface) type, or a bus of UART (Universal Asynchronous Receiver Transmitter) type. According to an example, processor 2011 is adapted to communicating with secure element 2012, for example, via a bus of I2C (Inter Integrated Circuit) type or a bus of SPI (Serial Peripheral Interface) type. According to an example, secure element 2012 is adapted to communicating with NFC module 2013, for example, via a bus of SWP (Single Wire Protocol) type by using, for example, a communication protocol of HCI (Host-Controller Interface) type or a communication protocol of CLT (ContactLESS) type, or, for example, via a shared data memory by using a communication mechanism of IPC (Inter-Process Communication) type. To communicate together, secure element 2012 and NFC module 2013 may, for example, use a communication protocol of VNP (VPP Network Protocol, VPP significant Virtual Primary Platform) type, such a protocol may be used with an I2C-type or SPI-type bus. According to an example, processor 2011 is adapted to communicating with card 2019, for example, by using, for example, a communication protocol of ISO7816 type. According to an example, card 2019 is adapted to communicating with NFC module 2013, for example, via a bus of SWP (Single Wire Protocol) type.

Further, card device 201, and more particularly processor 2011, is adapted to implementing different software programs enabling it to execute different functionalities, including, more particularly, that of engaging and performing an NFC transaction with another electronic device, such as terminal 203. The software architecture of card device 201, and more precisely of processor 2011, comprises different applications enabling a user to implement different functionalities and a plurality of interface software layers 2016 (PLATFORM), or interface software 2016 enabling to translate the commands sent by the applications into commands interpretable by the different circuits and components of card device 201, such as secure element 2012 and NFC module 2013. According to an embodiment, software layers 2016, which allow the operation of application 2014, are capable of knowing whether the NFC transaction is a transaction during which critical information and data may be exchanged, or not. Further, according to a variant, software layers 2016 are adapted to comparing the type of terminal previously determined by NFC module 2013 with a command received afterwards from said terminal.

In FIG. 2, card device 201 is adapted to implementing at least one application 2014 (Card App) having the functionality of, among others, implementing an NFC transaction of the type of that described in relation with FIG. 1 as a card. Application 2014 may be an application storing information linked to a card such as a payment card or a transport card. According to an example, card device 201 may implement one or a plurality of other applications 2015 (App 2). There is called in this description "application" a software, the manipulation of which is accessible to the user of card device 201. To implement the different functionalities of card device 201, the applications are adapted to using the different circuits and components of card device 201 by sending commands to interface software layers 2016.

Interface software layers 2016 comprises:
a primary interface layer 2017 (API); and
a layer for controlling 2018 (DRIVERS) the circuits and components of card device 201.

Primary interface layer 2017 is a software interface directly receiving the orders of operations to be performed originating from applications 2014 and 2015 and which converts these operations into a series of commands adapted to the different circuits and components of card device 201. In other words, if an application sends the order of executing an operation requiring the use of a plurality of circuits or components of card device 201, interface 2017 converts this order into a set of commands. An operation may be performed by implementing one or a plurality of commands intended for one or a plurality of circuits or components of card device 201.

The control layer 2018 of the circuits and components of card device 201 consists of all the software programs for controlling circuits and components 201, that is, the software driving the circuits and components of card device 201. In other words, control layer 2018 consists of all the programs enabling to implement the commands delivered by interface 2017. Each circuit or component is associated with control software adapted to implementing it. This control software is commonly called driver software, or "driver".

Figure 3:
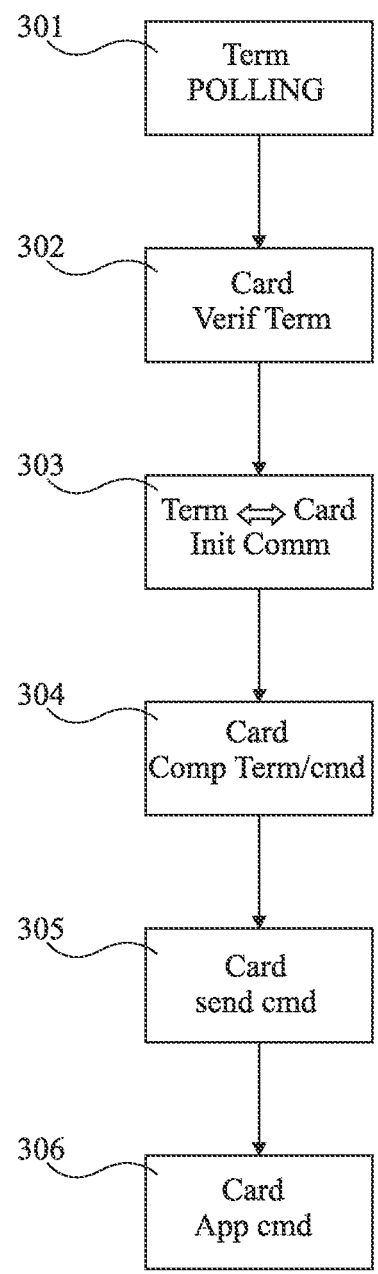
FIG. 3 shows a block diagram illustrating a first implementation mode of a method of protection of the embodiment of FIG. 3.

FIG. 3 is a block diagram illustrating steps of an implementation mode of a first method of protection of an electronic device during the implementation of an NFC transaction of the type of the NFC transaction described in relation with FIG. 1. These steps are executed by the card device 201 and the terminal 203 described in relation with FIG. 2.

At a step 301 (Term POLLING), terminal 203 tries to initiate an NFC transaction and starts emitting a polling frame POLLING.

At a step 302 (Card Verif Term), card device 201 is placed within range of terminal 203 and captures polling frame POLLING. In other words, polling frame POLLING is captured by the antenna circuit of NFC module 2013 of card device 201. According to an embodiment, NFC module 2013 then performs an analysis of polling frame POLLING to identify the type of terminal 203, as previously described in relation with FIG. 2. To perform this analysis, NFC module 2013, or its antenna circuit, bases itself on the characteristics of the polling frame, that is, the data and/or the commands that it transmits, its time characteristics, and/or the characteristics of the electromagnetic field that transmits it. Further, according to an example, to perform this analysis, NFC module 2013 may further base itself on a sequence of commands following the polling frame. According to a variant, this analysis of the polling frame may be implemented by the antenna circuit of NFC module 2013.

NFC module 2013 may, at that time, determine, for example, whether terminal 203 emits a polling frame POLLING, or polling sequence POLLING, corresponding to a known standard, or whether terminal 203 emits a polling frame POLLING which does not correspond to a known standard, or corresponding to another standard, or also corresponding to a malicious terminal. According to a practical example, a polling frame defined for a terminal of payment terminal type is different from a polling frame defined for terminals complying with the emission protocols of polling frames defined in the NFC-Forum standard. NFC module stores the result of its analysis, or sends it to secure element 2012 or to software layers 2016, according to which software element of the device manages the NFC transaction.

At a step 303 (Term <-> Card Init Comm), an NFC transaction is initiated between card device 201 and terminal 203. In other words, card device 201 responds to polling frame POLLING, without however delivering critical and/or secret data.

At a step 304 (Card Comp Term/cmd), terminal 203 then sends one or a plurality of commands to card device 201, these commands are addressed to the application 2014 implemented by card device 201. Card device 201 then performs a comparison of the commands received from terminal 203 with the result of the analysis performed by NFC module 2013 carried out at step 302, or by its antenna circuit if relevant. This comparison may be implemented by the NFC module 2013 or by the secure element 2012 of card device 201.

Such a comparison may enable to verify whether the command received by card device 201 effectively corresponds to a command, or to a control sequence, that would generally be sent by a terminal of the type of terminal 203. In other words, such a comparison may enable to reveal a malicious device trying to implement an NFC transaction, for example, an NFC transaction during which critical and/or secret data are exchanged. According to a specific example, such a comparison may enable to avoid for a card device to implement a bank transaction with a terminal pretending to be a conventional payment terminal.

At a step 305 (Card send cmd), the comparison having been performed, the commands(s) are transmitted to application 2014, for example, by NFC module 2013 or by secure element 2012. According to an embodiment, the result of the comparison performed at step 304 is also transmitted to the application, for example, by the elements having performed this comparison, that is, NFC module 2013 or secure element 2012. Further, and according to an example, the result of the analysis performed at step 302 is also transmitted to the application, for example, by NFC module 2013 or by secure element.

At a step 306 (Card App Cmd), the application receives the command(s) as well as the result of the comparison, and, possibly, the result of the analysis of the type of terminal 203. The application has to take the decision according to all these elements to know how to respond to the received commands.

According to a first example, the result of the analysis indicates that terminal 203 is a conventional terminal used to perform an NFC transaction, and the result of the comparison indicates that the commands are also conventional. Application 2014 may, in this case, decide to trust terminal 203 and to respond to the commands, or may very well, on the contrary, decide not to respond to the command(s), or to decide to only respond to some of the received commands, or to respond with erroneous data.

According to a second example, the result of the analysis indicates that terminal 203 is a conventional terminal used to perform an NFC transaction, and the result of the comparison indicates that the commands are not conventional commands for this type of terminal 203. Application 2014 may, in this case, decide to trust terminal 203 and to respond to the commands, or may very well, on the contrary, decide not to respond to the command(s), or to decide not to trust terminal 203, and thus not to respond to the received command(s), or to respond with erroneous data.

According to a third example, the result of the analysis indicates that terminal 203 is not a conventional terminal or is not a terminal of a type known by card device 201, and the result of the comparison thus indicates that the command(s) are not reliable. Application 2014 may, in this case, decide not to trust terminal 203 and not to respond to the commands, or may, for example, decide to respond to the commands with erroneous data. According to another example, application 2014 may decide to ignore these results to nevertheless respond to the commands of terminal 203.

According to a fourth example, the result of the analysis may be uncertain, and the application may interrogate the user of the device to validate the sending of the data, for example by using a button, the verification of a password, and/or a biometric verification, etc.

Figure 4:
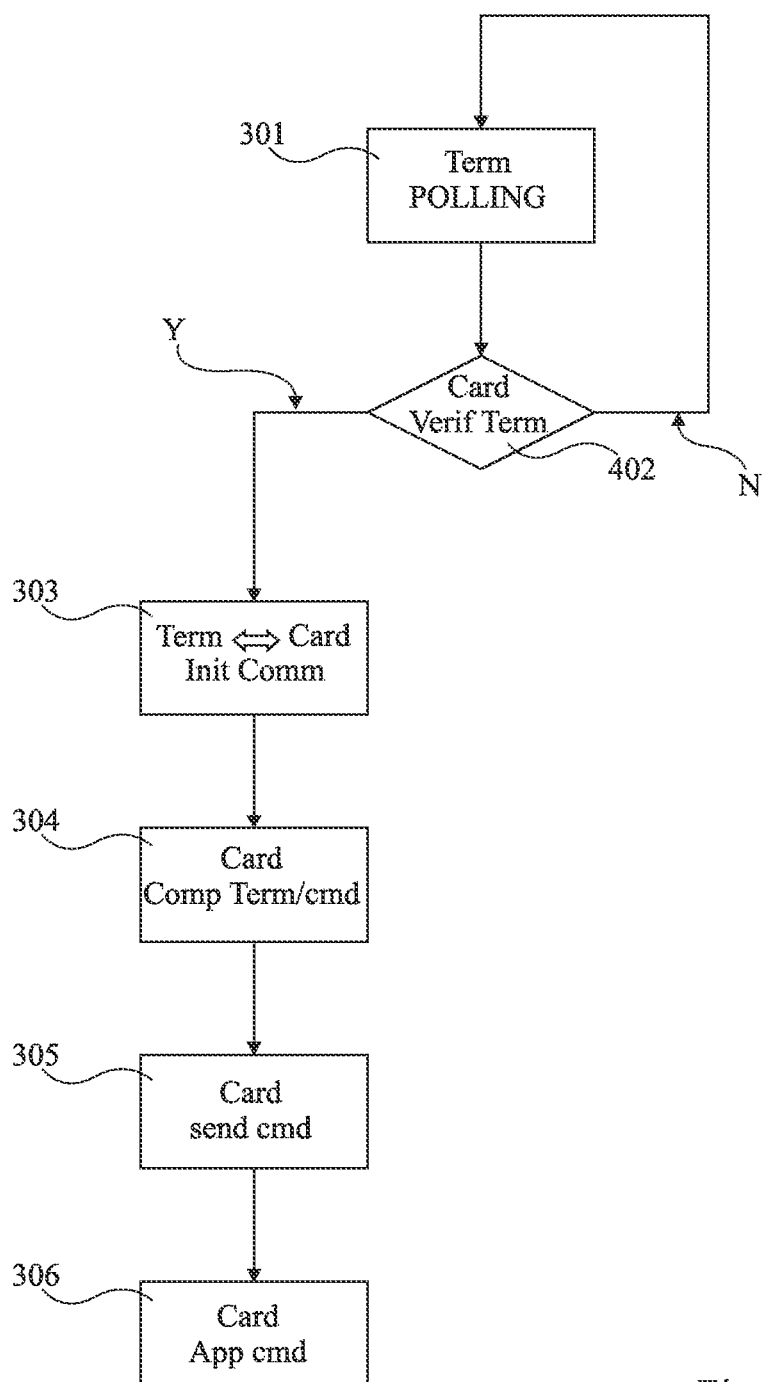
FIG. 4 shows a block diagram illustrating a second mode implementation mode of a method of protection of the embodiment of FIG. 3.

FIG. 4 is a block diagram illustrating steps of an implementation mode of a second method of protection of an electronic device during the implementation of an NFC transaction of the type of the NFC transaction described in relation with FIG. 1. These steps are executed by the card device 201 and the terminal 203 described in relation with FIG. 2.

The method described in relation with FIG. 4 exhibits steps common with the method described in relation with FIG. 3. The steps common to the two methods are not described again in details, and only the different steps are highlighted herein.

The method of FIG. 4 comprises the following step:
step 301 (Term POLLING);
step 303 (Term <-> Card Init Comm);
step 304 (Card Comp Term/cmd);
step 305 (Card send cmd); and
step 306 (Card App Cmd).

The step 302 of the method of FIG. 3 is replaced with a step 402 taking place between steps 301 and 303.

At step 402 (Card Verif Term), card device 201 is placed within range of terminal 203 and captures polling frame POLLING. In other words, polling frame POLLING is captured by the antenna circuit of the NFC module 2013 of card device 201. According to an embodiment, NFC module 2013 then performs an analysis of polling frame POLLING to identify the type of terminal 203. To perform this analysis, NFC module 2013, or its antenna circuit, bases itself on the characteristics of the polling frame, that is, the data and/or the commands that it transmits, its time characteristics, and/or the characteristics of the electromagnetic field that it transmits. According to a variant, this analysis of the polling frame may be implemented by the antenna circuit of NFC module 2013.

According to an embodiment, NFC module 2012 may then be used as a filter, and take the decision to initiate or not an NFC transaction with terminal 203. If the result of the analysis indicates that terminal 203 is a conventional terminal or is a reliable terminal (output Y of step 402), the next step is step 303. If the result of the analysis indicates that terminal 203 is a non-conventional terminal (output N of step 402), the next step is step 301, in other words terminal 203 keeps on looking for a device to perform an NFC transaction by emitting its polling frame, and card device 201 does not respond to this polling frame even if it keeps on capturing it.

According to an alternative embodiment, if the result of the analysis indicates that terminal 203 is a non-reliable terminal, NFC module 2012 may send erroneous data to terminal 203 as a response to the polling frame.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

Electronic device (201) may be summarized as including a processor (2011) hosting an application (2014), a near-field communication module (2012), and a secure element (2012) distinct from the processor (2011), wherein the near-field communication module (2012) is configured to identify the type of a terminal (203) emitting a polling frame (POLLING), addressed to said application (2014), that the communication module receives by analyzing the type of said polling frame (POLLING), said device (201) being configured to compare the result of said analysis with at least one command received from said terminal (203) during the implementation of an NFC transaction.

Method of protection of an electronic device may be summarized as including a processor (2011) hosting an application (2014), a near-field communication module (2012), and a secure element (2012) distinct from the processor (2011), said method including the following successive steps during the implementation of a transaction: said near-field communication module (2012) identifies the type of a terminal (203) emitting a polling frame (POLLING), addressed to said application (2014), that the communication module receives by analyzing the type of said polling frame (POLLING); and said device compares the result of said analysis with at least one command received from said terminal (203) during the implementation of an NFC transaction.

Once said comparison has been performed, said at least one command may be transmitted to said application (2014) with the result of the comparison.

Once said comparison has been performed, the result of said analysis may be transmitted to the application with said at least one command and said result of the comparison.

Said application (2014) may be configured to take the decision of responding or not to said at least one command.

Said near-field communication module (2012) may include an antenna circuit adapted to radio frequencies, said circuit being configured to identify the type of a terminal (203) emitting a polling frame (POLLING), addressed to said application (2014), that it receives by analyzing the type of said polling frame (POLLING).

Said secure element (2012) may be configured to compare the type of terminal (203) with said at least one received command.

Said near-field communication module (2012) may be further configured to compare the type of terminal (203) with said at least one received command.

Said near-field communication module (2012) may be further configured to send erroneous data to the sender if the result of said comparison indicates that the type of the sender is not reliable.

If the result of said comparison indicates that the type of the sender is not reliable, said at least one application (2014) may refuse to send critical data.

Said comparison may be performed by comparing said result of said analysis with at least two commands received from said terminal (203) during the implementation of an NFC transaction.

Said comparison may be further performed by interrogating a user of said device.

Said processor (2011) may further host at least one interface software layer (2016) adapted to implementing said at least one application (2014).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device, comprising:
a processor hosting an application;
a near-field communication device; and
a secure element distinct from the processor,
wherein the near-field communication device is configured to identify a type of a terminal emitting a polling frame, addressed to the application and received by the near-field communication device, by analyzing a type of the polling frame and generating an analysis result, and
wherein the electronic device is configured to compare the analysis result with at least one command received from the terminal during an implementation of an NFC transaction, wherein in response to the comparison result indicating that the type of sender is not reliable, the application refrains from sending critical data.

2. The device according to claim 1, wherein the electronic device is configured to, in response to comparing the analysis result with the at least one command, send the at least one command to the application with the comparison result.

3. The device according to claim 2, wherein the electronic device is configured to, in response to comparing the analysis result with the at least one command, send the analysis result to the application with the at least one command and the comparison result.

4. The device according to claim 1, wherein the application determines whether to respond to the at least one command.

5. The device according to claim 1, wherein the near-field communication device includes an antenna circuit operable over radio frequencies and configured to identify the type of terminal emitting the polling frame, addressed to the application, that the antenna circuit receives by analyzing the type of the polling frame.

6. The device according to claim 1, wherein the secure element is configured to compare the type of terminal with the at least one received command.

7. The device according to claim 1, wherein the near-field communication device is configured to compare the type of terminal with the at least one received command.

8. The device according to claim 1, wherein the near-field communication device is configured to send data indicating an error to a sender if the comparison result indicates that the type of sender is not reliable.

9. The device according to claim 1, wherein the comparison is performed by comparing the analysis result with at least two commands received from the terminal during the implementation of the NFC transaction.

10. The device according to claim 1, wherein the comparison is performed by interrogating a user of the device.

11. The device according to claim 1, wherein the processor hosts at least one interface software layer adapted to implementing the application.

12. A method, comprising: identifying, by a near-field communication device, a type of a terminal emitting a polling frame that the near-field communication device receives by analyzing a type of the polling frame to generate an analysis result, the near-field communication device being included in an electronic device, the electronic device including a processor that hosts an application and a secure element distinct from the processor, and the polling frame being addressed to the application; and
comparing, by the electronic device, the analysis result with at least one command received from the terminal during an implementation of an NFC transaction, wherein in response to the comparison result indicating that the type of sender is not reliable, the application refrains from sending critical data.

13. The method according to claim 12, comprising:
in response to comparing the analysis result with the at least one command, sending, by the electronic device, the at least one command to the application with the comparison result.

14. The method according to claim 13, comprising:
in response to comparing the analysis result with the at least one command, sending, by the electronic device, the analysis result to the application with the at least one command and the comparison result.

15. The method according to claim 12, comprising:
determining, by the application, whether to respond to the at least one command.

16. The method according to claim 12, comprising:
identifying, by an antenna circuit of by the near-field communication device includes operable over radio frequencies and configured to, the type of terminal emitting the polling frame, addressed to the application, that the antenna circuit receives by analyzing the type of the polling frame.

17. A system, comprising:
a terminal; and
an electronic device including:
a processor hosting an application;
a near-field communication device; and
a secure element distinct from the processor,
wherein the near-field communication device is configured to identify a type of the terminal emitting a polling frame, addressed to the application and received by the near-field communication device, by analyzing a type of the polling frame and generating an analysis result, and wherein the electronic device is configured to compare the analysis result with at least one command received from the terminal during an implementation of an NFC transaction, wherein in response to the comparison result indicating that the type of sender is not reliable, the application refrains from sending critical data.

18. The system according to claim 17, wherein the electronic device is configured to, in response to comparing the analysis result with the at least one command, send the at least one command to the application with the comparison result.

19. The system according to claim 18, wherein the electronic device is configured to, in response to comparing the analysis result with the at least one command, send the analysis result to the application with the at least one command and the comparison result.

\* \* \* \* \*